(12) United States Patent
England

(10) Patent No.: US 10,452,384 B2
(45) Date of Patent: Oct. 22, 2019

(54) DEVICE HEALTH TICKETS

(71) Applicant: Microsoft Technology Licensing, LLC, Redmond, WA (US)

(72) Inventor: Paul England, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/888,899

(22) Filed: Feb. 5, 2018

(65) Prior Publication Data

US 2019/0243630 A1 Aug. 8, 2019

(51) Int. Cl.
| | |
|---|---|
| *H04L 29/06* | (2006.01) |
| *H04L 29/08* | (2006.01) |
| *G06F 9/445* | (2018.01) |
| *G06F 8/65* | (2018.01) |
| *G06F 21/55* | (2013.01) |

(52) U.S. Cl.
CPC .............. *G06F 8/65* (2013.01); *G06F 21/554* (2013.01); *G06F 2221/034* (2013.01)

(58) Field of Classification Search
CPC ... H04L 69/40; H04L 63/0807; H04L 9/3247; H04L 9/30; H04L 2209/24; G06F 21/88; G06F 8/65; G06F 2221/034; G06F 2221/2107
See application file for complete search history.

(56) References Cited

U.S. PATENT DOCUMENTS

| | | | | |
|---|---|---|---|---|
| 9,507,579 | B2* | 11/2016 | Gambardella | .......... H04L 65/80 |
| 9,529,602 | B1* | 12/2016 | Swierk | ..................... G06F 9/441 |
| 9,645,811 | B2* | 5/2017 | Carlen | ..................... H04L 65/80 |
| 9,804,901 | B2* | 10/2017 | Gambardella | .......... H04L 65/80 |
| 10,185,730 | B2* | 1/2019 | Bestler | ................. G06F 16/2255 |
| 2012/0278878 | A1* | 11/2012 | Barkie | ................. H04L 63/0272 |
| | | | | 726/15 |
| 2015/0058640 | A1* | 2/2015 | Balakrishnan | ........ G06F 21/575 |
| | | | | 713/193 |
| 2018/0341584 | A1* | 11/2018 | Letey | ................... G06F 12/0661 |
| 2019/0081873 | A1* | 3/2019 | Kraft | ....................... G06F 21/54 |
| 2019/0081983 | A1* | 3/2019 | Teal | ......................... G06F 21/54 |

OTHER PUBLICATIONS

Moharreri et al., Recommendations for Achieving Service Levels within Large-scale Resolution Service Networks, 10 pages (Year: 2015).*

(Continued)

*Primary Examiner* — Thuy Dao
(74) *Attorney, Agent, or Firm* — Schwegman Lundberg & Woessner, P.A.

(57) ABSTRACT

Disclosed are systems that provide for secure and reliable remote management. Cryptographic health tickets provided by a management server are provided to a protected process executing on a computing device. In some examples, the health tickets reset an authenticated watchdog timer that resets the computing device if the timer expires. In some examples, the computing device may contact the management server prior to loading an operating system to receive instructions, but may omit contacting the management server if a valid health ticket is found.

21 Claims, 6 Drawing Sheets

(56) References Cited

OTHER PUBLICATIONS

"Trusted Platform Architecture—Hardware Requirements for a Device Identifier Composition Engine", Retrieved From <<https://www.trustedcomputinggroup.org/wp-content/uploads/Device-Identifier-Composition-Engine-Rev69_Public-Review.pdf>>, Dec. 16, 2016, 11 pages.
Samuel, Arjmand, "Azure IoT supports new security hardware to strengthen IoT security", Retrieved From <<https://azure.microsoft.com/en-us/blog/azure-iot-supports-new-security-hardware-to-strengthen-iot-security/>>, Apr. 20, 2017, 4 Pages.
Aigner, et al., "Cyber-Resilient Platform Requirements", Retrieved From <<https://www.microsoft.com/en-us/research/publication/cyber-resilient-platform-requirements/>>, Aug. 28, 2017, pp. 1-17.
England, et al., "Device Identity with DICE and RIoT: Keys and Certificates", In Technical Report of MSR-TR-2017-41, Sep. 21, 2017, pp. 1-15.
England, et al., "RIoT—A Foundation for Trust in the Internet of Things", In Technical Report of MSR-TR-2016-18, Apr. 21, 2016, pp. 1-17.
George, Sam, "Microsoft simplifies IoT further", Retrieved From <<https://blogs.microsoft.com/iot/2017/04/20/microsoft-simplifies-iot-further/>>, Apr. 20, 2017, 6 pages.
Qiu, et al., "Trusted Computer System Evaluation Criteria", In National Computer Security Center, Dec. 26, 1985, pp. 1-116.
Regenscheid, Andrew, "Platform Firmware Resiliency Guidelines", Retrieved From <<https://csrc.nist.gov/CSRC/media/Publications/sp/800-193/draft/documents/sp800-193-draft.pdf>>, May 2017, 46 Pages.

\* cited by examiner

DEVICE HEALTH TICKETS

TECHNICAL FIELD

The present disclosure relates in some examples to secure and reliable remote management of computing devices utilizing health tickets.

BACKGROUND

Computing devices are becoming smaller, more powerful, more efficient, and more useful. As a result, computing devices are found in an increasing variety of devices. For example, lightbulbs, refrigerators, televisions, thermostats, garage door openers, and the like. These computing devices may be connected to a network such as a mesh network of other devices and/or the Internet to allow users to obtain the status of, and to control these devices. The collection of these devices and the network of interconnectivity they create have been termed the Internet of Things (IOT) and the constituent devices have been termed IoT devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
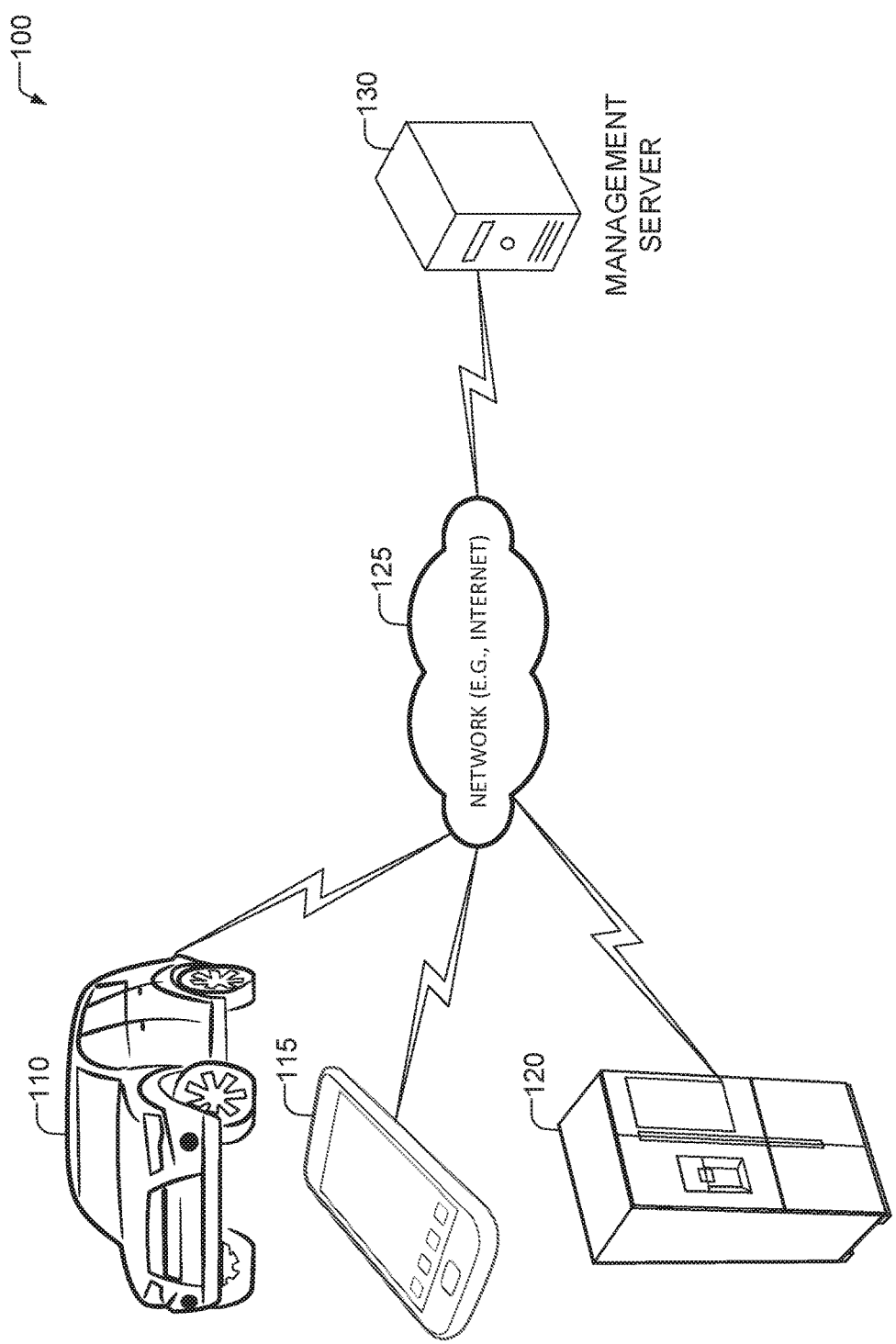
FIG. 1 shows a schematic of a computing device remote management environment according to some examples of the present disclosure.

Secure, reliable management of computing devices (such as IoT devices) has proven challenging. The combination of the shear amount of these devices, the simplicity of the devices (including their modest user interfaces), and the utilization of an unsecured network (e.g., the Internet) means that problems may arise that are difficult to detect and fix. For example, a computing device may have been compromised with malware or a virus; a configuration may be wrong and the computing device may be functioning improperly; the operating software or other software on the computing device may be malfunctioning as a result of a transient error (e.g., a memory bit flip, or the like); or the software may be out-of-date.

To guard against some of these problems, these computing devices may be designed to have self-healing features. For example, a computing device may have a watchdog timer that resets the computing device if the watchdog timer is not periodically reset by the operating system of the computing device. These watchdog timers prevent and correct for errors where the software in the device is not responding (e.g., the software is stuck in an infinite loop). The watchdog timer does not address situations in which the device is functioning well enough to reset the watchdog timer, but the device is otherwise not functioning as desired. For example, malware or misconfigured settings that do not affect the operating system to a degree that prevents the computing device from resetting the watchdog timer. To correct such problems, physically updating or resetting the device may be required. The watchdog timer also does not remedy cases where the device is not running up-to-date software.

To further alleviate the above problems and shortcomings of the watchdog timer, a central management platform may be used that can help monitor and manage the devices through a network. For example, the platform may determine that a device is infected with malware or otherwise is not performing ideally and reboot the device remotely. In addition this central management platform may manage software updates and other maintenance tasks.

One problem with the central management platform is that it relies upon software on the devices themselves to cooperate with the central management platform. If the software is compromised or not listening to the management server, the management server has no control over the device. Specialized devices such as Service Processors (SPs) and Baseboard Management Controllers (BMCs) exist that are separate hardware devices that are employed to manage desktops and servers. Intelligent backplanes may be used to manage blades in data centers. These technologies run highly secure operating systems and communicate with the management server to control the devices. However, these technologies do not apply well to certain environments such as IoT computing devices because of their cost, power needs, and the requirement of an out-of-band management channel.

Disclosed in some examples are systems, methods, devices, and machine-readable mediums that implement an authenticated watchdog timer on a computing device to provide secure remote computing device management. The authenticated watchdog timer is reset by a single-use health ticket obtained by the computing device (e.g., an operating system on the computing device) from the management service over a network. If the computing device fails to obtain a valid health ticket before the watchdog timer expires, the computing device executes a recovery action which may include one or more of: rebooting the device, downloading new software, contacting the management server, applying a configuration change, and the like.

The authenticated watchdog timer may be implemented in software (e.g., firmware), hardware, or a combination of software and hardware. The execution of the authenticated watchdog timer may be protected such that it is not interfered with by other software and processes on the computing device. The authenticated watchdog timer may execute on or be implemented using a separate processor from the main processor(s) of the device (e.g., the processors that execute the operating system and applications), may execute on the main processor(s) as a separate process (and may be protected by TSX or other protections), or may be a regular process executing on the main processor(s).

In the disclosed system, the decision as to whether the device is authorized to continue normal functions or take some other action is made by the management server and the functionality to enforce this decision is at the computing device and is protected from interference by malware or malfunctioning software by cryptography and other methods. This solves the technical problems of traditional remote device management that utilize local software that may be compromised or hung and/or management servers.

As previously noted, the existing watchdog timers offered limited detection and remediation of issues. As previously described, management servers could offer enhanced functionality in detection and remediation but previously had no way to force the computing devices to take necessary actions outside of expensive extra hardware. The present disclosure improves the functioning of the computing devices by allowing for analysis of the computing device's behavior by an independent third-party (the management service) while ensuring that the management service's commands are followed without the use of expensive devices such as SPs.

The authenticated watchdog timer may include additional or upgraded hardware for cryptographic functions, random number generators and the like in order to validate the health tickets. This may be undesirable in some very limited computing devices where cost, power, and/or size are important and where running these cryptographic related processes regularly as a watchdog timer is undesirable.

In these examples, the computing device may employ a watchdog timer that is non-resettable. That is, once the watchdog timer is set, it will expire and the device will reboot and the operating system or software on the device cannot prevent this reboot. On a reboot, it will execute early boot code (e.g., code that executes prior to the operating system (OS), prior to a network stack being loaded by the operating system, and the like) which tends to be easier to secure than other processes such as an OS (and thus easier to secure) because the code is relatively simple and in some cases because of hardware-based protections. Examples of early boot code include Basic Input Output System (BIOS) code, Unified Extensible Firmware Interface (UEFI) code, firmware, and the like. This code may exist in Read Only Memory (ROM) or enjoy other protections against malware compromise.

In some examples, to provide for reliable remote management of these computing devices, this early boot code may load a network stack and communicate with a management server to allow the management server the opportunity to take a recovery action such as update the firmware of the computing device, update settings, apply a configuration change (e.g., such as a new or updated firewall rule), or the like. Loading a network stack and contacting a server as part of early-boot code may delay booting significantly (several seconds to minutes depending on the speed of the processor and network connections). This delay is annoying to users, impractical in some applications, and may reduce the "up-time" for these devices. For most reboots, this early boot code will not need to perform any functions: the device will be up-to-date and healthy. The reboot is utilized to give the chance for the early boot code to check with the cloud controller to ensure the device is functioning normally, but most of the time the cloud controller will just reply with "reboot as normal."

Disclosed in some examples are methods, systems, and machine readable mediums that utilize health tickets to determine whether to load a network stack and contact a management service early in the booting process. In some examples, during regular operation, an operating system on the computing device may obtain a health ticket. During a reboot (e.g., as a result of a watchdog timer reset), the early boot code may check for a valid health ticket. If the health ticket was not obtained or is not valid (e.g., either the device has not recently obtained a health ticket, or the management server did not provide one as the device may be malfunctioning), the early boot code may load a network stack and contact the management server for a recovery action. This allows for maximum performance while still allowing remote management and allows for very simple validation code. Thus, the disclosed techniques provide an alternative solution to the more resource intensive authenticated watchdog timer by providing a simpler watchdog timer coupled with checking health tickets during the reboot.

As used herein, the term trusted process is used to refer to the authenticated watchdog timer process and early boot code. The trusted process is code that may be protected from attack through one or more of: execution protection (e.g., trusted execution environments), memory protection, and the like. As used herein a health ticket may be in the form of a data structure sent by a management server that indicates that the management server is satisfied with the health of the computing device. The health ticket may be one time use and secured from forgery. For example, the health ticket may be cryptographically protected from reuse and forgery by including a nonce value generated by the trusted process in a digital signature signed by the management server using symmetrical or asymmetrical cryptography. For example, a public key/private key system, a keyed-hash message authentication code (HMAC), and the like. In other examples, the health ticket may be secured from reuse and forgery by application of a one time pad may be utilized. That is, the management server and the trusted process may both have a list of secret values. The trusted process may secure the list of secret values in memory that is not accessible to any other process on the computing device. Each of the secret values in the list is used only once and in-order. If the health ticket includes the correct secret value, the health ticket is considered valid. In some examples, if the list of secret values runs out, a new list of secret values may be sent to the trusted process. For example, during a boot sequence the trusted process may load a network stack and communicate directly with the management server. In other examples, another process (e.g., an operating system or application) may obtain updates to the list of secret values. The updates may be cryptographically protected, such as by symmetrical or asymmetrical cryptography.

For examples in which the health ticket is secured against forgery and reuse by cryptography, one or more cryptographic keys may be provisioned to the trusted process at manufacture time of the device. In other examples, the trusted process may receive the keys over a network, such as during early boot phases. Keys received over a network may be protected using certificates signed by a certificate authority.

FIG. 1 shows a schematic of a computing device remote management environment 100 according to some examples of the present disclosure. Computing device 110 may be an IoT device incorporated into an automobile, computing device 115 may be a smartphone, and computing device 120 may be an IoT device incorporated into a refrigerator. The devices shown in FIG. 1 are examples for illustrative purposes and one of ordinary skill in the art will appreciate that the present disclosure is applicable to any network connected computing device. These devices may be connected, either directly or indirectly to management server 130, e.g., through a network 125. Management server 130 may be a computing device that is configured to monitor the computing devices 110, 115, and 120 over network 125. Example monitoring tasks include monitoring network traffic to and from the devices, monitoring software executing on the devices, performing remote virus and malware scanning on the devices, and the like. In some examples, management server 130 may be a MICROSOFT® AZURE® IOT SERVICES platform. Network 125 may be or include portions of the Internet, a Wide Area Network (WAN), a Local Area Network (LAN), or the like. Computing devices 110, 115, and 120 and management server 130 may be connected to the network 125 through wired or wireless connections.

Management server 130 may issue health tickets in response to requests from the computing devices 110, 115, and 120 based upon the observed behaviors of the computing devices and the policy of the management server 130. The policy of the management server may comprise one or more rules that specify under what conditions to issue a new health ticket. The health ticket may be secured from reuse and forgery, for example, by being cryptographically signed by the management server with a private key of the management server. The corresponding public key of the management server may be distributed to the computing devices 110, 115, 120—for example, during their manufacture, through a certificate authority, or the like. The cryptographic signature may include a nonce value provided by the requesting computing device.

Figure 2:
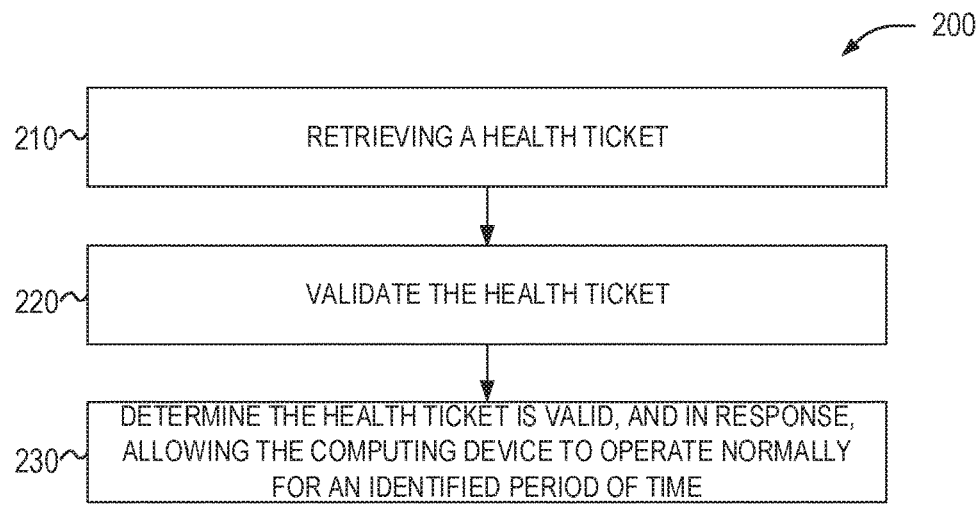
FIG. 2 shows a flowchart of an example overview method for using health tickets to allow for remote management by a remote management service.

FIG. 2 shows a flowchart of an example overview method 200 for using health tickets to allow for remote management by a remote management service. Method 200 may be performed by a trusted process of the computing device. As previously noted, the term trusted process is used to refer to the authenticated watchdog timer process and early boot code. The trusted process may be software implemented, hardware implemented, or a combination of software and hardware implemented. The trusted process may execute on a same hardware processor as other software components, a separate hardware processor, or in some examples some portions of the trusted process may execute on a same hardware processor as other software components and some portions of the trusted process may execute on a different hardware processor.

If the trusted process is executing on the same processor as other software components (e.g., the operating system, firmware, and/or applications) it may utilize protection modes (e.g., permissions levels, Trusted Execution Environments (TEE), System Management Mode (SMM), and the like) and may be protected at rest from malware and other problems by being placed in a location of non-volatile memory that is read-only, or that is otherwise protected from modification (e.g., storage write-locks).

At operation 210 the trusted process may look for a health ticket. For example, a second process executing on the computing device (e.g., an operating system or other application) of the computing device may obtain the health ticket from a management server and communicate it to the trusted process. For example, the second process may provide the health ticket to the trusted process by storing the health ticket in a shared area of non-volatile memory or a shared area of volatile memory, inter-process communication, through some other Application Programming Interface (API) defined method, or the like. In examples in which the trusted process is an authenticated watchdog timer, the second process may notify the trusted process that a health ticket is available, or the trusted process may periodically check.

At operation 220 the trusted process may validate the health ticket to ensure it has not been forged or reused. For example, the health ticket may be cryptographically signed by the management service and the cryptographic signature may include a nonce. The nonce may prevent ticket-reuse and ensure freshness. The nonce may be a pseudorandom number that the trusted process previously created, stored, and provided to the second process (e.g., operating system, application, hypervisor, or the like) to provide to the management process.

The second process may receive this nonce (e.g., from shared memory, or the like) and pass it to the management service. The management service may then cryptographically sign the health ticket (including the nonce) with the private key of the management service. The computing device may then validate the health ticket at operation 220 by utilizing the public key of the management service to decrypt the signature and the nonce. If the signature is valid and the nonce in the decrypted signature is the most recently created nonce, the health ticket is validated.

As previously noted, other methods to secure the health ticket may be utilized, such as a list of secrets. In these examples, validating the health ticket may be comparing the secret in the health ticket to the next secret in the list. If the secret in the health ticket matches the next secret in the list, the ticket is validated. In these examples, the trusted process does not generate a nonce.

At operation 230 if it is determined that the health ticket is valid, the computing device may be allowed to operate normally for an identified epoch. The identified epoch may be a number of enhanced watchdog timeouts, a number of boot cycles that avoid loading a network stack and contacting the management server during early boot code operation, a predetermined period of time, or the like. In some examples, the epoch may be greater than one, such that multiple reboots or timeouts may be possible without having to get another health ticket. In other examples, the epoch may be one such that every watchdog timeout or every reboot requires a new health ticket. In some examples, operating normally for an identified period of time includes not loading a network stack in the trusted process (e.g., early boot code).

Figure 3:
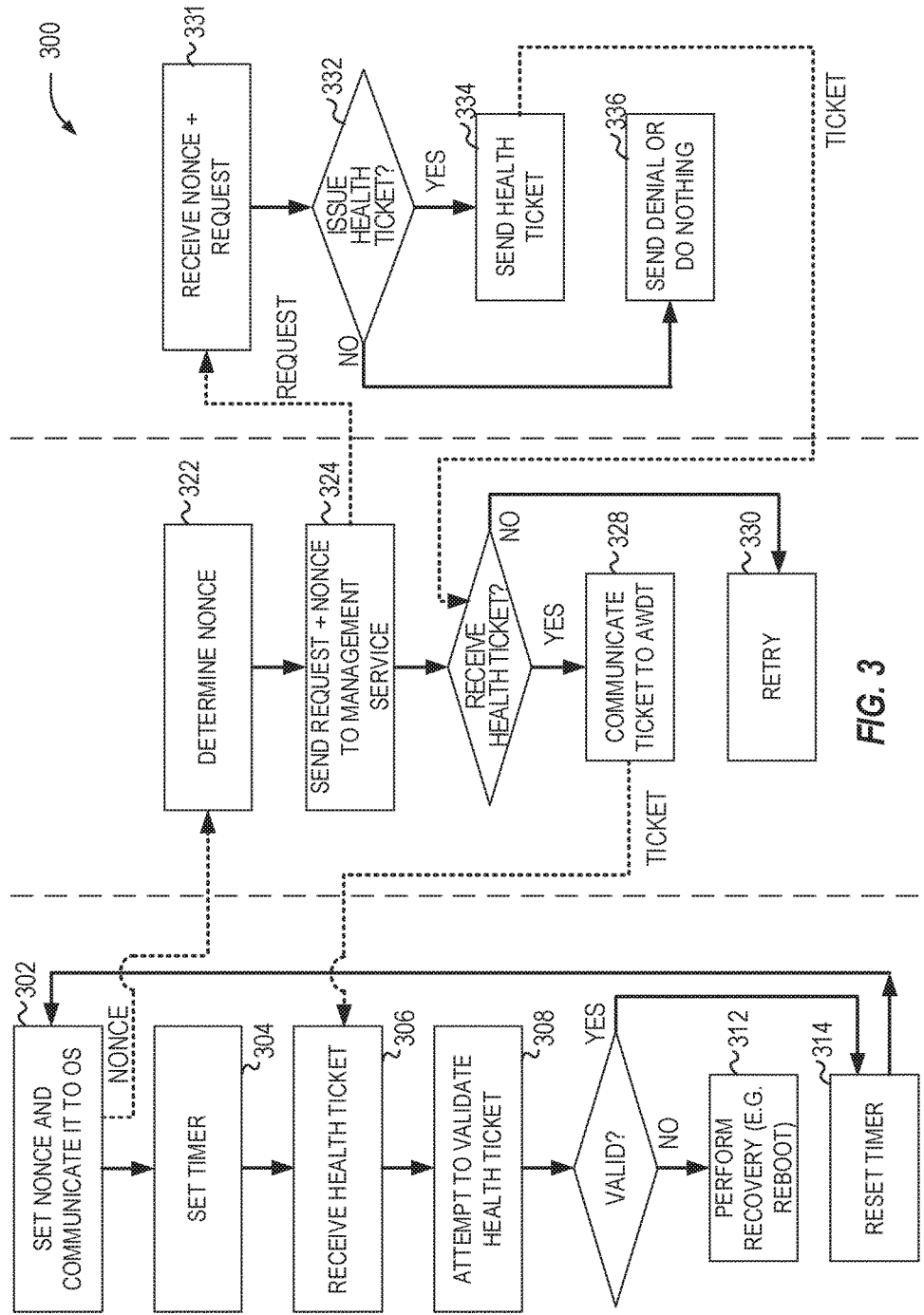
FIG. 3 shows a flowchart of a trusted process in the form of an authenticated watchdog timer according to some examples of the present disclosure.

FIG. 3 shows a flowchart 300 of a trusted process in the form of an authenticated watchdog timer according to some examples of the present disclosure. Operations 302, 304, 306, 308, 312, and 314 are performed by the authenticated watchdog timer. Operations 322, 324, 328, and 330 are performed by a second process such as an operating system, application, hypervisor, or the like. Operations 331, 332, 334, and 336 are performed by the management server.

At operation 302 the authenticated watchdog timer determines a nonce and communicates it to the second process. In some examples, the nonce is a random number generated by a hardware or software random number generator. This nonce may be communicated to the second process in a variety of ways, such as for example through a shared memory, interprocess communication, and the like. As previously noted, if the health ticket is secured with a secret list, this step may not be performed.

At operation 304 the authenticated watchdog timer may set the watchdog timer to a determined starting value. This may be a software timer, a hardware timer, or the like. If the watchdog timer expires, the device resets. Later, at operation 306 the authenticated watchdog timer may receive a health ticket. For example, the authenticated watchdog timer may receive a notification from the second process that a new health ticket is available at the shared memory location, receive an interprocess communication, or the like. At operation 308 the authenticated watchdog timer attempts to validate the health ticket by verifying the signature and/or that the nonce is the expected nonce from operation 302. In examples in which the health ticket is secured with a secret list, the authenticated watchdog timer attempts to validate the health ticket by comparing the secret in the health ticket with the expected secret in memory. At operation 312 if the health ticket is not valid, then the device may be begin a recovery action. For example, the device may be rebooted, processing may end, the second process may be notified, or the like. At operation 314 if the health ticket is validated, the watchdog timer may be reset to the starting value.

As previously noted, operations 322, 324, 328, and 330 are performed by a second process which may include an operating system, application software, or the like. At operation 322 the second process may determine a current nonce value. In some examples, this may be determined by reading a shared memory location. In other examples, other forms of communication (e.g., an API) between the second process and the protected code may be utilized, such as messages, packets, interprocess communication, and the like. As noted above, for cases that use a secret list, the second process may not read the nonce value. At operation 324 the second process may send to the management service a request for a fresh health ticket and may include the nonce value. If the second process receives a fresh health ticket than at operation 328 the second process may communicate that fresh ticket to the authenticated watchdog timer. For example, by utilizing the same or different mechanism by which the second process obtained the nonce value. For example, through shared memory, messaging, interprocess communication, and the like. If the second process fails to receive a health ticket from the management service (e.g., after a timeout period) the second process may re-request the health ticket at operation 330.

As previously noted operations 331, 332, 334, and 336 are performed by the management server. The management server may receive the nonce and request for a health ticket at operation 331. At operation 332 the management server may determine whether to issue a fresh health ticket. The decision may be based upon a policy of the management server that comprises one or more rules that specify one or more conditions including whether the computing device is running the latest software (e.g., if an update is necessary a health ticket may not be issued until the device is updated), whether it is exhibiting unwanted behavior (the behavior of the computing device may be monitored by the management server), and the like. If the management server determines that it will issue a health ticket, then at operation 334, the health ticket is created and sent to the computing device. The health ticket may be created by cryptographically signing the nonce with a private key of the management server. As noted, in other examples, the health ticket may be created by including a next secret value from a list of secret values. Once a secret value is used, it may be removed from the list of secret values at both the trusted process and the management server. If at operation 332 the management server determines that a health ticket is not to be issued, then at operation 336, the management server may send a denial, take no action, or take another action (e.g., instruct the device to update itself), or the like as per policy of the management server.

Figure 4:
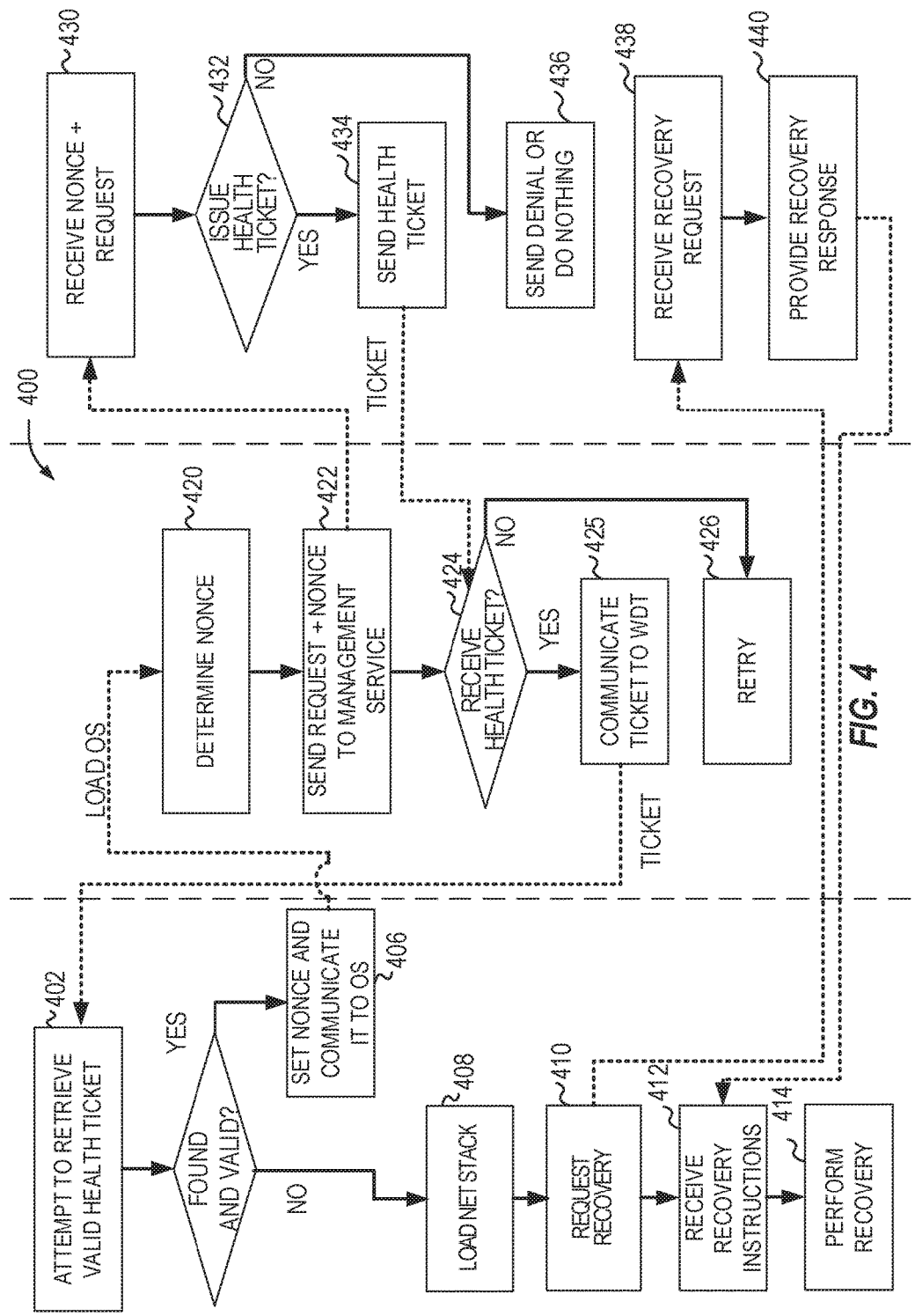
FIG. 4 shows a flowchart of a trusted process in the form of early-boot code according to some examples of the present disclosure.

FIG. 4 shows a flowchart 400 of a trusted process in the form of early-boot code according to some examples of the present disclosure. Operations 402, 406, 408, 410, and 412 are performed by early boot code. Early boot code may be code that is executed prior to the loading of an operating system, firmware, or application program such as a bootloader, early stage firmware, network stack, and the like. Operations 420, 422, 424, 425, and 426 are performed by the second process. Operations 430, 432, 434, 436, 438, and 440 are performed by the management server.

Flow begins during boot (prior to loading of the operating system, firmware, a network stack, or the like). At operation 402 where the early boot code attempts to retrieve a valid health ticket. For example, the early boot code looks in a predetermined location in non-volatile storage. A valid health ticket is one that has a proper signature and/or contains the latest nonce value (which is also stored in non-volatile storage). If the health ticket is found and is valid, then at operation 406 a fresh nonce is created, stored, and may be communicated to the second process. The early-boot code then finishes operations (not shown for clarity) and loads the operating system (which may load any applications including the second application if that role is not being fulfilled by the operating system). Notably the early-boot code does not load the network stack in this case. As previously described in other examples, a valid health ticket is one in which the health ticket includes the correct secret value from a list of secret values shared by the trusted process and the management server. Once a secret value is used, it may be removed from the list of secret values.

On the other hand, if the health ticket was not found or was not valid, then the early boot code may load the network stack at operation 408. At operation 410, using the network stack the early boot code may request recovery instructions (e.g., an action) from the management server. At operation 412 the early boot code receives the instructions from the management server and at operation 414 the early boot code may perform the recovery action. Example recovery actions include one or more of: updating software, changing a configuration setting, rebooting the device, and the like.

As previously noted, operations 420, 422, 424, 425, and 426 are performed by an operating system or other application that comes after the early boot code in a boot order of the computing device. At operation 420, once the second process is executing, the second process may determine a current nonce value. In some examples, this may be determined by reading a shared memory location. In other examples, other forms of communication (e.g., an API) between the shared process and the protected code may be utilized, such as messages, packets, interprocess communication, and the like. As noted above, for cases that use a secret list, the second process may not read the nonce value.

At operation 422 the second process may send a request to the management service for a fresh health ticket and may include the nonce value. If the second process receives a fresh health ticket than at operation 425 the operation system may communicate that fresh ticket to the early boot code. For example, by utilizing the same or different mechanism by which the second process obtained the nonce value. For example, through shared memory, messaging, interprocess communication, and the like. If the second process fails to receive a health ticket from the management service (e.g., after a timeout period) the second process may re-request the health ticket at operation 426.

As previously noted, operations 430, 432, 434, 436, 438, and 440 are performed by the management server. The management server may receive the nonce and request for a health ticket at operation 430. At operation 432 the management server may determine whether to issue a fresh health ticket. The decision may be based upon a policy of the management server that comprises one or more rules that specify one or more conditions including whether the computing device is running the latest software (e.g., if an update is necessary a health ticket may not be issued until the device is updated), whether it is exhibiting unwanted behavior (the behavior of the computing device may be monitored by the management server), and the like. If the management server determines that it will issue a health ticket, then at operation 434, the health ticket is created and sent to the computing device. The health ticket may be created by cryptographically signing the nonce with a private key of the management server. As noted, in other examples, the health ticket may be created by including a next secret value from a list of secret values. Once a secret value is used, it may be removed from the list of secret values at both the trusted process and the management server. If at operation 432 the management server determines that a health ticket is not to be issued, then at operation 436 the management server may send a denial, take no action, or take another action (e.g., update the software of the computing device), or the like as per policy of the management server.

If the management server receives a recovery request at 436, then the management server may reply with recovery actions at operation 440. As noted, the recovery actions may include updating software, changing a configuration, rebooting, and the like. For example, the management server may store a reason why the health ticket was denied at operation 436 and if the computing device requests a recovery instruction the recovery instruction may be based upon the reason the health ticket was denied. For example, the management server policy may contain determined recovery actions for denial reasons.

It should be noted that in some examples, the nonce value is protected from modification by the second process to prevent the second process from setting its own nonce value. Thus if a non-volatile memory location is used to store the nonce and also communicate it to the OS, it may be made read-only to the second process or otherwise protected from modification by the second process. In other examples, the nonce may be stored in memory accessible only to the early boot code or authenticated watchdog timer process and a different memory address may be used to communicate it to the second process. This is to prevent the second process from bypassing the health ticket security by continuously writing a stale nonce value to the shared memory location.

Figure 5:
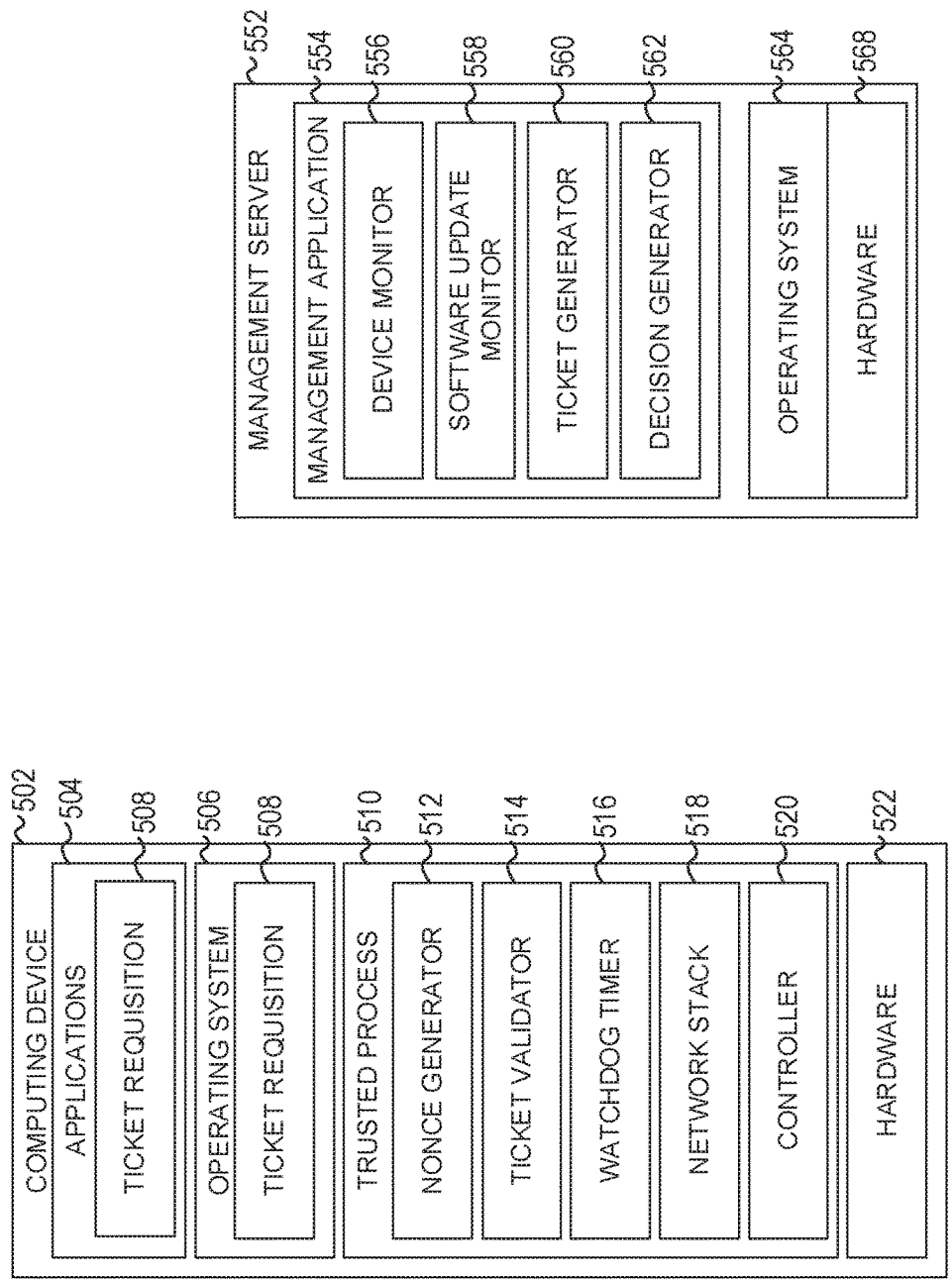
FIG. 5 shows a logical schematic of a computing device and a logical schematic of a management server according to some examples of the present disclosure.
Figure 6:
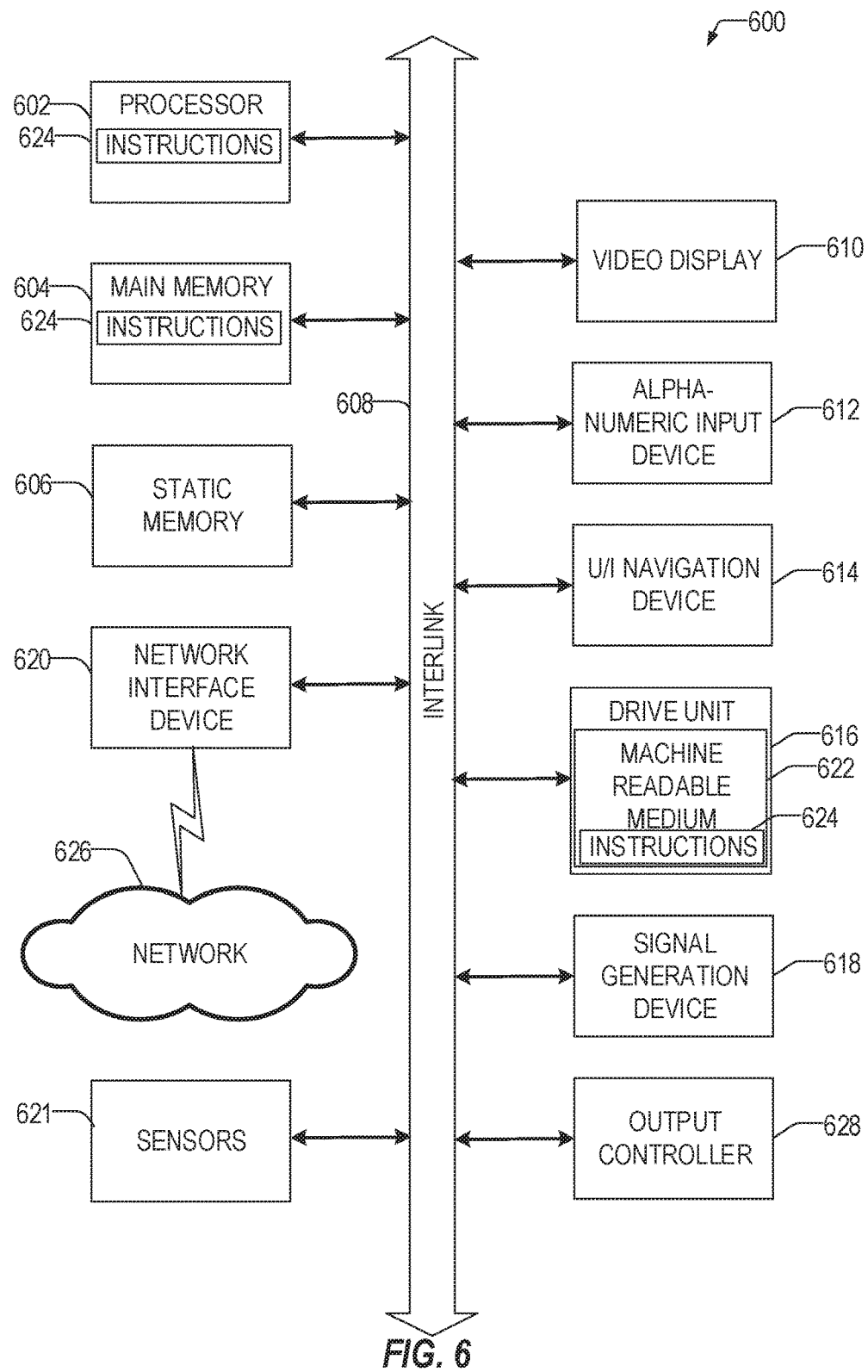
FIG. 6 is a block diagram illustrating an example of a machine upon which one or more embodiments may be implemented.

FIG. 5 shows a logical schematic of a computing device 502 and a logical schematic of a management server 552 according to some examples of the present disclosure. Computing device 502 and management server 552 may include hardware layer 522, and hardware layer 568, respectively. Example hardware in the hardware layer is shown in FIG. 6. Computing device 502 may have trusted process 510 which may execute on one or more processors in the hardware layer 522. Trusted process 510 may not contain all the components shown in FIG. 5 in all cases. For example, if the trusted process 510 is early boot code, it may not include the watchdog timer (which may be separate). Similarly, if the trusted process 510 is an authenticated watchdog timer, the trusted process 510 may not include the network stack 518. As previously noted, the trusted process 510 may execute on a same hardware processor as operating system 506 and applications 504, on a different hardware processor, or partially on the same hardware processor and partially on a different hardware processor.

Trusted process 510 may be early boot code, authenticated watchdog timer code, or both. In some examples, the early boot code that may execute prior to operating system 506 and applications 504. In some examples, the trusted process may have a controller 520 that may control the operations of the trusted process 510. Trusted process may also include a network stack 518 which may be loaded, for example, if the trusted process is early boot code and is unable to find a valid health ticket during a boot. The controller 520 may utilize network stack 518 to contact management server 552 (which may have its own network stack—not shown for clarity) and may obtain information on recovery actions to take such as updating an operating system 506, a firmware, applications, and the like. Controller 520 may implement the recovery actions.

Watchdog timer 516 may implement either a resettable or a non-resettable watchdog timer. For example, if the trusted process is an authenticated watchdog timer, the timer may be resettable. Controller 520 of the authenticated watchdog timer may create a nonce (using nonce generator 512), set a watchdog timer, receive a health ticket, validate the health ticket and reset the watchdog timer 516 if the health ticket is valid.

Ticket validator 514 may validate the cryptographic signature on a health ticket provided by the operating system 506 using the public key of the management service. The ticket may also be validated by comparing the nonce in the signature with the expected nonce (the current nonce). If the decrypted nonce in the health ticket matches the expected nonce, the ticket may be considered valid, otherwise the ticket may be determined as invalid. As noted, in other examples, the health ticket may be created by including a next secret value from a list of secret values. Once a secret value is used, it may be removed from the list of secret values at both the trusted process and the management server. The health ticket is validated if the secret value in the health ticket matches the appropriate secret value in the list. Nonce generator 512 may generate a random nonce. The random nonce may be a hardware or software generated random number. For example, ticket validator 514 may maintain the current nonce in write-protected non-volatile storage. Once the health ticket is validated, the current nonce may be overwritten by a newly generated random nonce value by the nonce generator 512

Operating system 506 and 564 of computing device 502 and management server 552 respectively may provide an interface for upper level applications (such as applications 504 and management application 554) to the hardware. Operating system 506 and 564 may provide services to applications such as scheduling services, memory access services, input/output services and the like. Operating system 506 or an application in applications 504 may have a ticket requisition component 508 that may communicate with the trusted process 510 to obtain a current nonce and may communicate with the management server 552 to acquire new health tickets with the current nonce periodically (e.g., every predetermined period of time). Ticket requisition component 508 may also communicate health tickets acquired from the management server 552 to the trusted process 510. Applications 504 may execute one or more end-user applications. For example, a thermostat application, a refrigerator application, a smartphone application, and the like.

The operating system 506 and/or the applications 504 may communicate nonces and health tickets with each other through a variety of means. For example, shared volatile or non-volatile memory addresses, interprocess communication, messages, packets, interrupts, registers, and the like.

Management application 554 on management server 552 may provide remote device management for one or more computing devices, such as computing device 502. Device monitor 556 may monitor the health of one or more computing devices 502. For example, device monitor 556 may send status messages to the computing devices it manages.

If the computing devices fail to reply, the device monitor 556 may indicate a failure. Other examples including monitoring the network traffic to determine if a computing device managed by the management server is engaged in a denial of service attack, or otherwise exhibiting unwanted and/or unusual network behavior.

Software update monitor 558 may determine the versions of firmware, operating system, applications, and other software on the computing devices managed by the management server 552. Software update manager determines if these software components are running a desired version. For example, a latest version. Ticket generator 560 generates one or more signed health tickets based upon a provided nonce value. Ticket generator generates the tickets by cryptographically signing the health ticket and including the nonce value in the signature with a private key of the management server 552. As noted, in other examples, the health ticket may be created by including a next secret value from a list of secret values. Once a secret value is used, it may be removed from the list of secret values at both the trusted process and the management server. The ticket validator 514 of the computing device may then use the public key of the management server 552 to decrypt the nonce value and compare the nonce value to the expected nonce value.

Decision generator 562 determines, based upon the device monitor 556, software update monitor 558, and other factors whether to continue to issue health tickets to the computing device. For example, the management server 552 may have one or more policy rules that specify under what conditions to issue a health ticket and under what conditions a health ticket is not to be issued. These rules may utilize a number of factors such as software versions running (as determined by the software update monitor 558), computing device behavior (e.g., as monitored by the device monitor 556), last reboot (e.g., after a predetermined amount of time, the management server 552 may pre-emptively reboot the computing device), and the like.

While the above described examples in which utilized watchdog timers to trigger a reboot to transfer control to the trusted process, in other examples, other so called "attention triggers" may be utilized, for example, a message from the management service may trigger the reboot to the trusted process. Additionally, the above early-boot code examples utilized a non-resettable watchdog timer. In other examples, the non-resettable watchdog timer may not be utilized (and the device may only enter the trusted process when a reboot happens naturally).

Also, while the above disclosure mentions operating systems and applications, it will be appreciated by one of ordinary skill in the art that operating system is a broad term and may encompass firmware and other operating software. For example, firmware and applications may be the same software application. Also, the trusted process is shown throughout as a separate process from the operating system, but one of ordinary skill will understand that the trusted process may be part of the operating system. In these examples, the trusted process may be loaded as part of the operating system, and may be loaded prior to the kernel.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a computing device such as a personal computer (PC), a tablet PC, a set-top box (STB), a personal digital assistant (PDA), a mobile telephone, a smart phone, an IoT device, a thermostat, a drone, a refrigerator, or the like. In some examples, machine 600 may be a management server, a web appliance, a network router, switch or bridge, or the like. Machine 600 may be any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620. The Machine 600 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MMO), or multiple-input single-output (MISO) techniques. In some examples, the network interface device 620 may wirelessly communicate using Multiple User MIMO techniques.

Other Notes and Examples

Example 1 is a computing device comprising: a hardware processor executing a trusted process to perform operations comprising: retrieving a health ticket from a second process executing on the computing device, the health ticket obtained by the second process from a management server over a computing network; validating the health ticket by validating a cryptographic signature in the health ticket using a cryptographic key of the management server; and responsive to validating the health ticket, allowing the computing device to operate normally for an identified epoch.

In Example 2, the subject matter of Example 1 includes, wherein the trusted process is an authenticated watchdog timer that resets the computing device upon expiry of the watchdog timer and wherein the operations of allowing the computing device to operate normally for the identified epoch comprises resetting the watchdog timer.

In Example 3, the subject matter of Examples 1-2 includes, wherein the trusted process is an early boot code process that is loaded prior to the second process and the identified epoch is a number of boot cycles of the computing device, and wherein the operations of allowing the computing device to operate normally for the identified epoch comprises allowing the computing device to load an operating system during a boot process of each of the number of boot cycles without loading a network stack with the early boot code process.

In Example 4, the subject matter of Examples 1-3 includes, wherein the operations comprise resetting the computing device responsive to the identified epoch expiring and based upon a determination that a second health ticket has not been obtained or is not valid.

In Example 5, the subject matter of Examples 1-4 includes, wherein the operations further comprise: resetting the computing device responsive to the identified epoch expiring and wherein upon an initialization of the computing device after the reset and prior to loading of an operating system: determining that a second health ticket is not present or valid, responsive to determining that the second health ticket is not present or not valid, executing network software on the computing device as part of the trusted process; communicating, via the network software, with the management server over the computing network and obtaining instructions from the management server; and executing the instructions obtained from the management server as part of the trusted process.

In Example 6, the subject matter of Example 5 includes, wherein the instructions obtained from the management server are instructions to download a new software object.

In Example 7, the subject matter of Examples 5-6 includes, wherein the instructions obtained from the management server are to apply a configuration change.

In Example 8, the subject matter of Examples 1-7 includes, wherein the second process is one of: an operating system, an application, or a firmware.

In Example 9, the subject matter of Examples 1-8 includes, wherein the hardware processor is different than a hardware processor executing the second process.

In Example 10, the subject matter of Examples 1-9 includes, wherein the trusted process resides in a protected memory space of the computing device.

In Example 11, the subject matter of Example 10 includes, wherein the trusted process resides in Read Only Memory (ROM).

Example 12 is a method for facilitating remote monitoring of a computing device, the method comprising: using a hardware processor of the computing device to execute a trusted process to perform operations comprising: retrieving a health ticket from a second process executing on the computing device, the health ticket obtained by the second process from a management server over a computing network; validating the health ticket by validating a cryptographic signature in the health ticket using a cryptographic key of the management server; and responsive to validating the health ticket, allowing the computing device to operate normally for an identified epoch.

In Example 13, the subject matter of Example 12 includes, wherein the trusted process is an authenticated watchdog timer that resets the computing device upon expiry of the watchdog timer and wherein allowing the computing device to operate normally for the identified epoch comprises resetting the watchdog timer.

In Example 14, the subject matter of Examples 12-13 includes, wherein the trusted process is an early boot code process that is loaded prior to the second process and the identified epoch is a number of boot cycles of the computing device, and wherein allowing the computing device to operate normally for the identified epoch comprises allowing the computing device to load an operating system during a boot process of each of the number of boot cycles without loading a network stack with the early boot code process.

In Example 15, the subject matter of Examples 12-14 includes, resetting the computing device responsive to the identified epoch expiring and based upon a determination that a second health ticket has not been obtained or is not valid.

In Example 16, the subject matter of Examples 12-15 includes, resetting the computing device responsive to the identified epoch expiring and wherein upon an initialization of the computing device after the reset and prior to loading of an operating system: determining that a second health ticket is not present or valid; responsive to determining that the second health ticket is not present or not valid, executing network software on the computing device as part of the trusted process; communicating, via the network software, with the management server over the computing network and obtaining instructions from the management server; and executing the instructions obtained from the management server as part of the trusted process.

In Example 17, the subject matter of Example 16 includes, wherein the instructions obtained from the management server are instructions to download a new software object.

In Example 18, the subject matter of Examples 16-17 includes, wherein the instructions obtained from the management server are to apply a configuration change.

In Example 19, the subject matter of Examples 12-18 includes, wherein the second process is one of: an operating system, an application, or a firmware.

In Example 20, the subject matter of Examples 12-19 includes, wherein the hardware processor is different than a hardware processor executing the second process.

In Example 21, the subject matter of Examples 12-20 includes, wherein the trusted process resides in a protected memory space of the computing device.

In Example 22, the subject matter of Example 21 includes, wherein the trusted process resides in Read Only Memory (ROM).

Example 23 is a machine-readable medium for facilitating remote monitoring of a computing device, the machine-readable medium comprising instructions, which when executed by a hardware process, cause the hardware processor of the computing device to execute a trusted process to perform operations comprising: retrieving a health ticket from a second process executing on the computing device, the health ticket obtained by the second process from a management server over a computing network; validating the health ticket by validating a cryptographic signature in the health ticket using a cryptographic key of the management server; and responsive to validating the health ticket, allowing the computing device to operate normally for an identified epoch.

In Example 24, the subject matter of Example 23 includes, wherein the trusted process is an authenticated watchdog timer that resets the computing device upon expiry of the watchdog timer and wherein the operations of allowing the computing device to operate normally for the identified epoch comprises resetting the watchdog timer.

In Example 25, the subject matter of Examples 23-24 includes, wherein the trusted process is an early boot code process that is loaded prior to the second process and the identified epoch is a number of boot cycles of the computing device, and wherein the operations of allowing the computing device to operate normally for the identified epoch comprises allowing the computing device to load an operating system during a boot process of each of the number of boot cycles without loading a network stack with the early boot code process.

In Example 26, the subject matter of Examples 23-25 includes, wherein the operations further comprise resetting the computing device responsive to the identified epoch expiring and based upon a determination that a second health ticket has not been obtained or is not valid.

In Example 27, the subject matter of Examples 23-26 includes, wherein the operations further comprise: resetting the computing device responsive to the identified epoch expiring and wherein upon an initialization of the computing device after the reset and prior to loading of an operating system: determining that a second health ticket is not present or valid; responsive to determining that the second health ticket is not present or not valid, executing network software on the computing device as part of the trusted process; communicating, via the network software, with the management server over the computing network and obtaining instructions from the management server; and executing the instructions obtained from the management server as part of the trusted process.

In Example 28, the subject matter of Example 27 includes, wherein the instructions obtained from the management server are instructions to download a new software object.

In Example 29, the subject matter of Examples 27-28 includes, wherein the instructions obtained from the management server are to apply a configuration change.

In Example 30, the subject matter of Examples 23-29 includes, wherein the second process is one of: an operating system, an application, or a firmware.

In Example 31, the subject matter of Examples 23-30 includes, wherein the hardware processor is different than a hardware processor executing the second process.

In Example 32, the subject matter of Examples 23-31 includes, wherein the trusted process resides in a protected memory space of the computing device.

In Example 33, the subject matter of Example 32 includes, wherein the trusted process resides in Read Only Memory (ROM).

Example 34 is a computing device comprising: means for executing a trusted process to perform operations comprising: means for retrieving a health ticket from a second process executing on the computing device, the health ticket obtained by the second process from a management server over a computing network; means for validating the health ticket by validating a cryptographic signature in the health ticket using a cryptographic key of the management server; and means for allowing the computing device to operate normally for an identified epoch responsive to validating the health ticket.

In Example 35, the subject matter of Example 34 includes, wherein the trusted process is an authenticated watchdog timer that resets the computing device upon expiry of the watchdog timer and wherein the means for allowing the computing device to operate normally for the identified epoch comprises means for resetting the watchdog timer.

In Example 36, the subject matter of Examples 34-35 includes, wherein the trusted process is an early boot code process that is loaded prior to the second process and the identified epoch is a number of boot cycles of the computing device, and wherein the means for allowing the computing device to operate normally for the identified epoch comprises means for allowing the computing device to load an operating system during a boot process of each of the number of boot cycles without loading a network stack with the early boot code process.

In Example 37, the subject matter of Examples 34-36 includes, means for resetting the computing device responsive to the identified epoch expiring and based upon a determination that a second health ticket has not been obtained or is not valid.

In Example 38, the subject matter of Examples 34-37 includes, means for resetting the computing device responsive to the identified epoch expiring and wherein upon an initialization of the computing device after the reset and prior to loading of an operating system: means for determining that a second health ticket is not present or valid; responsive to determining that the second health ticket is not present or not valid, means for executing network software on the computing device as part of the trusted process; means for communicating, via the network software, with the management server over the computing network and obtaining instructions from the management server; and means for executing the instructions obtained from the management server as part of the trusted process.

In Example 39, the subject matter of Example 38 includes, wherein the instructions obtained from the management server are instructions to download a new software object.

In Example 40, the subject matter of Examples 38-39 includes, wherein the instructions obtained from the management server are to apply a configuration change.

In Example 41, the subject matter of Examples 34-40 includes, wherein the second process is one of: an operating system, an application, or a firmware.

In Example 42, the subject matter of Examples 34-41 includes, wherein the hardware processor is different than a hardware processor executing the second process.

In Example 43, the subject matter of Examples 34-42 includes, wherein the trusted process resides in a protected memory space of the computing device.

In Example 44, the subject matter of Example 43 includes, wherein the trusted process resides in Read Only Memory (ROM).

Example 45 is at least one machine-readable medium including instructions that, when executed by processing circuitry, cause the processing circuitry to perform operations to implement of any of Examples 1-44.

Example 46 is an apparatus comprising means to implement of any of Examples 1-44.

Example 47 is a system to implement of any of Examples 1-44.

Example 48 is a method to implement of any of Examples 1-44.

Example 49 is a computing device comprising: a hardware processor configured to execute a trusted process during a boot sequence of the computing device before a network stack is loaded by the computing device, the trusted process comprising instructions causing the computing device to perform operations comprising: determining that a valid health ticket issued by a management server accessible over a computer network is not present on the computing device, in response to determining that the valid health ticket is not on the computing device: executing instructions to create a network stack; requesting recovery instructions from a management server over a network; receiving the recovery instructions; and executing the recovery instructions.

In Example 50, the subject matter of Example 49 includes, wherein the trusted process is one of: a bootloader or a firmware.

In Example 51, the subject matter of Examples 49-50 includes, wherein on a second boot sequence of the computing device, the trusted process comprising instructions causing the computing device to perform the operations comprising: determining that a valid health ticket issued by the management server is present on the computing device; and in response to determining that the valid health ticket is present, causing the computing device to execute an operating system without the trusted process loading the network stack, requesting recovery instructions, receiving the recovery instructions, and executing the recovery instructions.

In Example 52, the subject matter of Example 51 includes, wherein the operating system comprises instructions to cause the computing device to perform operations comprising: requesting a new health ticket from the management server over the computer network; receiving the new health ticket from the management server; and communicating the new health ticket to the trusted process.

In Example 53, the subject matter of Examples 49-52 includes, wherein determining that a valid health ticket is not present on the computing device comprises determining that a health ticket is not at a predetermined location in a non-volatile memory of the computing device.

In Example 54, the subject matter of Examples 49-53 includes, wherein determining that a valid health ticket is not present on the computing device comprises: retrieving a health ticket from a predetermined location in a non-volatile memory of the computing device; and determining that a nonce value in the health ticket is not a current nonce value as set by the trusted process.

In Example 55, the subject matter of Examples 49-54 includes, wherein determining that a valid health ticket is not present on the computing device comprises: retrieving a health ticket from a predetermined location in a non-volatile memory of the computing device; and failing to validate a digital signature of the health ticket.

In Example 56, the subject matter of Examples 49-55 includes, wherein the recovery instructions include instructions for updating a software object on the computing device.

Example 57 is a method for facilitating remote monitoring of a computing device, the method comprising: using a hardware processor of the computing device to execute a trusted process during a boot sequence of the computing device before a network stack is loaded by the computing device, the trusted process: determining that a valid health ticket issued by a management server accessible over a computer network is not present on the computing device; in response to determining that the valid health ticket is not on the computing device: executing instructions to create a network stack; requesting recovery instructions from a management server over a network; receiving the recovery instructions; and executing the recovery instructions.

In Example 58, the subject matter of Example 57 includes, wherein the trusted process is one of: a bootloader or a firmware.

In Example 59, the subject matter of Examples 57-58 includes, wherein on a second boot sequence of the computing device, the trusted process: determining that a valid health ticket issued by the management server is present on the computing device; and in response to determining that the valid health ticket is present, causing the computing device to execute an operating system without the trusted process loading the network stack, requesting recovery instructions, receiving the recovery instructions, and executing the recovery instructions.

In Example 60, the subject matter of Example 59 includes, using an operating system on the computing device, the operating system: requesting a new health ticket from the management server over the computer network; receiving the new health ticket from the management server; and communicating the new health ticket to the trusted process.

In Example 61, the subject matter of Examples 57-60 includes, wherein determining that a valid health ticket is not present on the computing device comprises determining that a health ticket is not at a predetermined location in a non-volatile memory of the computing device.

In Example 62, the subject matter of Examples 57-61 includes, wherein determining that a valid health ticket is not present on the computing device comprises: retrieving a health ticket from a predetermined location in a non-volatile memory of the computing device; and determining that a nonce value in the health ticket is not a current nonce value as set by the trusted process.

In Example 63, the subject matter of Examples 57-62 includes, wherein determining that a valid health ticket is not present on the computing device comprises: retrieving a health ticket from a predetermined location in a non-volatile memory of the computing device; and failing to validate a digital signature of the health ticket.

In Example 64, the subject matter of Examples 57-63 includes, wherein the recovery instructions include instructions for updating a software object on the computing device.

Example 65 is a machine-readable medium comprising instructions for a trusted process, the instructions, when executed by a hardware processor of a computing device causing the computing device to perform operations during a boot sequence of a computing device before a network stack is loaded, the operations comprising: determining that a valid health ticket issued by a management server accessible over a computer network is not present on the computing device; in response to determining that the valid health ticket is not on the computing device: executing instructions to create a network stack; requesting recovery instructions from a management server over a network; receiving the recovery instructions; and executing the recovery instructions.

In Example 66, the subject matter of Example 65 includes, wherein the trusted process is one of: a bootloader or a firmware.

In Example 67, the subject matter of Examples 65-66 includes, wherein on a second boot sequence of the computing device, the operations comprise: determining that a valid health ticket issued by the management server is present on the computing device; and in response to determining that the valid health ticket is present, causing the computing device to execute an operating system without the trusted process loading the network stack, requesting recovery instructions, receiving the recovery instructions, and executing the recovery instructions.

In Example 68, the subject matter of Examples 65-67 includes, wherein the operations of determining that a valid health ticket is not present on the computing device comprises determining that a health ticket is not at a predetermined location in a non-volatile memory of the computing device.

In Example 69, the subject matter of Examples 65-68 includes, wherein the operations of determining that a valid health ticket is not present on the computing device comprises: retrieving a health ticket from a predetermined location in a non-volatile memory of the computing device; and determining that a nonce value in the health ticket is not a current nonce value as set by the trusted process.

In Example 70, the subject matter of Examples 65-69 includes, wherein the operations of determining that a valid health ticket is not present on the computing device comprises: retrieving a health ticket from a predetermined location in a non-volatile memory of the computing device; and failing to validate a digital signature of the health ticket.

In Example 71, the subject matter of Examples 65-70 includes, wherein the recovery instructions include instructions for updating a software object on the computing device.

Example 72 is a computing device comprising: a hardware processor configured to execute a trusted process during a boot sequence of the computing device before a network stack is loaded by the computing device, the trusted process comprising instructions causing the computing device to perform operations comprising: means for determining that a valid health ticket issued by a management server accessible over a computer network is not present on the computing device; in response to determining that the valid health ticket is not on the computing device: means for executing instructions to create a network stack; means for requesting recovery instructions from a management server over a network; means for receiving the recovery instructions; and means for executing the recovery instructions.

In Example 73, the subject matter of Example 72 includes, wherein the trusted process is one of: a bootloader or a firmware.

In Example 74, the subject matter of Examples 72-73 includes, wherein on a second boot sequence of the computing device, the trusted process: means for determining that a valid health ticket issued by the management server is present on the computing device; and means for causing the computing device to execute an operating system without the trusted process loading the network stack, requesting recovery instructions, receiving the recovery instructions, and executing the recovery instructions in response to determining that the valid health ticket is present.

In Example 75, the subject matter of Example 74 includes, using an operating system: means for requesting a new health ticket from the management server over the computer network; means for receiving the new health ticket from the management server; and means for communicating the new health ticket to the trusted process.

In Example 76, the subject matter of Examples 72-75 includes, wherein the means for determining that a valid health ticket is not present on the computing device comprises means for determining that a health ticket is not at a predetermined location in a non-volatile memory of the computing device.

In Example 77, the subject matter of Examples 72-76 includes, wherein the means for determining that a valid health ticket is not present on the computing device comprises: means for retrieving a health ticket from a predetermined location in a non-volatile memory of the computing device; and means for determining that a nonce value in the health ticket is not a current nonce value as set by the trusted process.

In Example 78, the subject matter of Examples 72-77 includes, wherein the means for determining that a valid health ticket is not present on the computing device comprises: means for retrieving a health ticket from a predetermined location in a non-volatile memory of the computing device; and means for failing to validate a digital signature of the health ticket.

In Example 79, the subject matter of Examples 72-78 includes, wherein the recovery instructions include instructions for updating a software object on the computing device.

Example 80 is at least one machine-readable medium including instructions that, when executed by processing circuitry, cause the processing circuitry to perform operations to implement of any of Examples 49-79.

Example 81 is an apparatus comprising means to implement of any of Examples 49-79.

Example 82 is a system to implement of any of Examples 49-79.

Example 83 is a method to implement of any of Examples 49-79.

What is claimed is:

1. A method for facilitating remote monitoring of a computing device, the method comprising:
   using a hardware processor of the computing device to execute a trusted process during a boot sequence of the computing device before a network stack is loaded by the computing device, the trusted process:
   determining that a valid health ticket issued by a management server accessible over a computer network is not present on the computing device, the determining comprising:
      retrieving a health ticket from a predetermined location in a non-volatile memory of the computing device; and
      failing to validate a digital signature of the health ticket;
   in response to determining that the valid health ticket is not on the computing device:
   executing instructions to create a network stack;
   requesting recovery instructions from a management server over a network;
   receiving the recovery instructions; and
   executing the recovery instructions.

2. The method of claim 1, wherein on a second boot sequence of the computing device, the trusted process:
   determining that a valid health ticket issued by the management server is present on the computing device; and
   in response to determining that the valid health ticket is present, causing the computing device to execute an operating system without the trusted process loading the network stack, requesting recovery instructions, receiving the recovery instructions, and executing the recovery instructions.

3. The method of claim 2, further comprising, using an operating system on the computing device, the operating system:
   requesting a new health ticket from the management server over the computer network;
   receiving the new health ticket from the management server; and
   communicating the new health ticket to the trusted process.

4. The method of claim 1, wherein the method further comprises:
   causing a nonce value to be provided to a management server; and
   failing to validate the digital signature of the health ticket based upon a mismatch between a value in the digital signature and the nonce.

5. The method of claim 4, wherein causing the nonce value to be provided to the management server comprises:
   providing the nonce value to an operating system, the operating system transmitting the nonce value to the management server.

6. The method of claim 5, wherein the method further comprises:
   generating a new nonce value at random every time the computing device boots.

7. A computing device comprising:
   a hardware processor configured to execute a trusted process during a boot sequence of the computing device before a network stack is loaded by the computing device, the trusted process comprising instructions causing the computing device to perform operations comprising:
   determining that a valid health ticket issued by a management server accessible over a computer network is not present on the computing device, the determining comprising:
      retrieving a health ticket from a predetermined location in a non-volatile memory of the computing device; and
      failing to validate a digital signature of the health ticket;
   in response to determining that the valid health ticket is not on the computing device:
   executing instructions to create a network stack;
   requesting recovery instructions from a management server over a network;
   receiving the recovery instructions; and
   executing the recovery instructions.

8. The computing device of claim 7, wherein the trusted process is one of: a bootloader or a firmware.

9. The computing device of claim 7, wherein on a second boot sequence of the computing device, the trusted process comprising instructions causing the computing device to perform the operations comprising:
   determining that a valid health ticket issued by the management server is present on the computing device; and in response to determining that the valid health ticket is present, causing the computing device to execute an operating system without the trusted process loading the network stack, requesting recovery instructions, receiving the recovery instructions, and executing the recovery instructions.

10. The computing device of claim 9, wherein the operating system comprises instructions to cause the computing device to perform operations comprising:
   requesting a new health ticket from the management server over the computer network;
   receiving the new health ticket from the management server; and
   communicating the new health ticket to the trusted process.

11. The computing device of claim 7, wherein the recovery instructions include instructions for updating a software object on the computing device.

12. The computing device of claim 7, wherein the operations further comprise:
   causing a nonce value to be provided to a management server; and
   failing to validate the digital signature of the health ticket based upon a mismatch between a value in the digital signature and the nonce.

13. The computing device of claim 12, wherein the operations of causing the nonce value to be provided to the management server comprises:
   providing the nonce value to an operating system, the operating system transmitting the nonce value to the management server.

14. The computing device of claim 13, wherein the operations further comprise:
   generating a new nonce value at random every time the computing device boots.

15. A hardware machine-readable storage medium comprising instructions for a trusted process, the instructions, when executed by a hardware processor of a computing device causing the computing device to perform operations during a boot sequence of a computing device before a network stack is loaded, the operations comprising:
   determining that a valid health ticket issued by a management server accessible over a computer network is not present on the computing device, the determining comprising:
      retrieving a health ticket from a predetermined location in a non-volatile memory of the computing device; and
      failing to validate a digital signature of the health ticket:
   in response to determining that the valid health ticket is not on the computing device:
      executing instructions to create a network stack;
      requesting recovery instructions from a management server over a network;
      receiving the recovery instructions; and
      executing the recovery instructions.

16. The hardware machine-readable storage medium of claim 15, wherein the trusted process is one of: a bootloader or a firmware.

17. The hardware machine-readable storage medium of claim 15, wherein on a second boot sequence of the computing device, the operations comprise:
   determining that a valid health ticket issued by the management server is present on the computing device; and
   in response to determining that the valid health ticket is present, causing the computing device to execute an operating system without the trusted process loading the network stack, requesting recovery instructions, receiving the recovery instructions, and executing the recovery instructions.

18. The hardware machine-readable storage medium of claim 15, wherein the recovery instructions include instructions for updating a software object on the computing device.

19. The hardware machine-readable storage medium of claim 15, wherein the operations further comprise:
   causing a nonce value to be provided to a management server; and
   failing to validate the digital signature of the health ticket based upon a mismatch between a value in the digital signature and the nonce.

20. The hardware machine-readable storage medium of claim 19, wherein the operations of causing the nonce value to be provided to the management server comprises:
   providing the nonce value to an operating system, the operating system transmitting the nonce value to the management server.

21. The hardware machine-readable storage medium of claim 20, wherein the operations further comprise:
   generating a new nonce value at random every time the computing device boots.

* * * * *